W. H. BELL.
SHOCK ABSORBER.
APPLICATION FILED APR. 10, 1912.

1,051,305.

Patented Jan. 21, 1913.

WITNESSES
H. J. Walker

INVENTOR
William H. Bell
BY
ATTORNEYS

UNITED STATES PATENT OFFICE.

WILLIAM H. BELL, OF NEW YORK, N. Y., ASSIGNOR TO OSWALD J. KARSCH, OF NEW YORK, N. Y.

SHOCK-ABSORBER.

1,051,305.  Specification of Letters Patent.  Patented Jan. 21, 1913.

Application filed April 10, 1912. Serial No. 689,812.

*To all whom it may concern:*

Be it known that I, WILLIAM H. BELL, a citizen of the United States, and a resident of the city of New York, borough of Manhattan, in the county and State of New York, have invented a new and Improved Shock-Absorber, of which the following is a full, clear, and exact description.

Among the principal objects which the present invention has in view are: to provide means for checking the free operation of the carrying springs of a vehicle when acted upon by the irregularities of the road; to provide means of the character mentioned to simplify and economize the construction; and to provide an absorber of the character mentioned shaped to vary the operation in accordance with the degree of vibration.

Reference is to be had to the accompanying drawings forming part of this specification, in which similar characters of reference indicate corresponding parts in both of the views, and in which—

Figure 1:
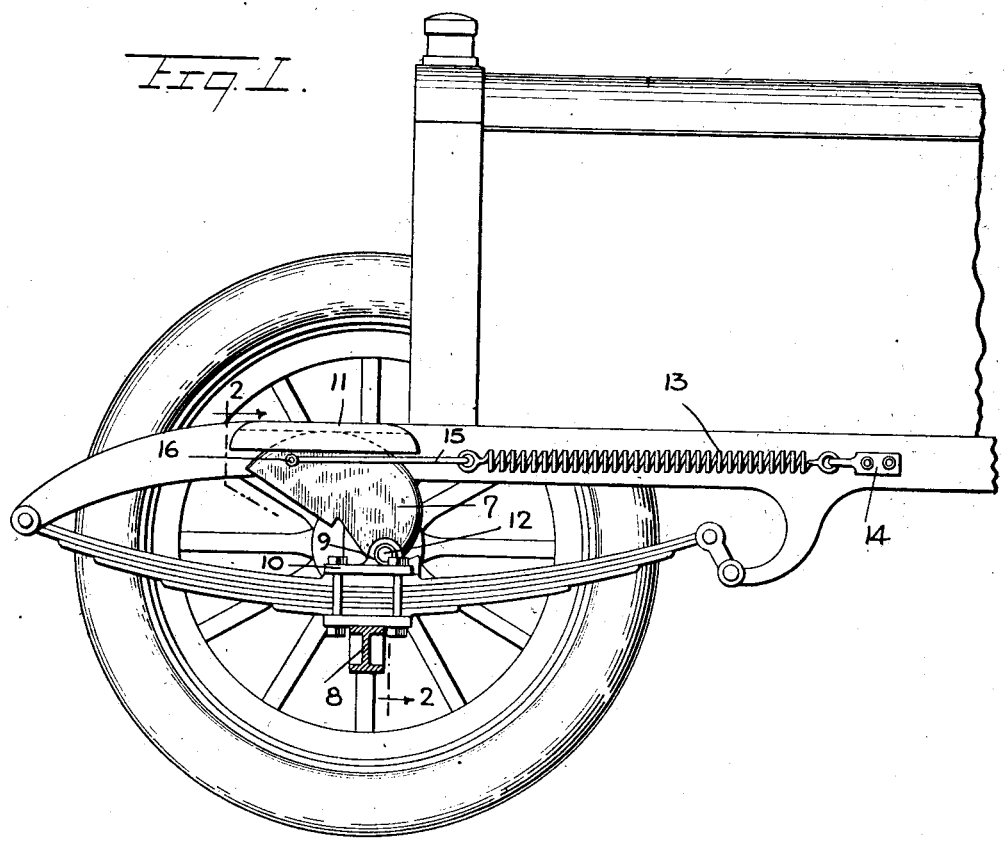
Figure 2:
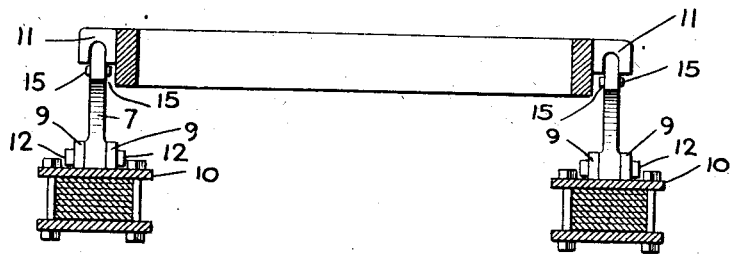

Figure 1 is a side view of a forward fragment of an automobile, showing in conjunction therewith a shock absorber constructed and arranged in accordance with the present invention; and Fig. 2 is a vertical section taken on the line 2—2 in Fig. 1.

As shown in the accompanying drawings, blocks 7 are disposed at each side of an axle 8, and are pivoted between tabs 9 formed on clip plates 10 provided to hold the carrying springs of the vehicle. Each of the blocks 7 is shaped to form a volute cam surface at the riding edge thereof. The cams are guided in slots provided in bracket plates 11.

Each side bar of the vehicle chassis is provided with a bracket plate 11, disposed in a manner best shown in Fig. 1 of the drawings, so that the point of contact between the riding surface of the blocks 7 and the plates 11 is under all conditions forward of the pivot pins 12 upon which the said plates 11 are mounted. The blocks 7 are lifted to bear constantly against the plates 11 by a spiral spring 13. The springs 13 are anchored to eye-plates 14 bolted securely to each side bar of the chassis. The end of the spring 13 opposite that attached to the plate 14 engages a bail, which is pivotally mounted by a pin 16 at the free end of the block 7. It will be understood that four of such blocks 7, as shown in Fig. 1, are employed, one connected with each of the carrying springs of the vehicle.

The operation of the blocks is as follows:—When the carrying wheel of the vehicle drops suddenly into a depression, or suddenly overrides an obstruction, the space between the carrying springs of the vehicle and the side bars of the chassis is suddenly increased or decreased, the springs yielding to accommodate the action. When, as in the first-mentioned instance, the wheel drops into a depression, the springs 13 draw the free end of each of the blocks 7 to maintain the blocks in constant contact with the bracket plates 11. If the wheel remains at the lower level, the body of the vehicle settles slowly to the normal riding position, thrusting gradually the blocks 7 from the path of the plates 11, and thereby checking and easing the fall of the body. As seen in Fig. 1 of drawings, the normal riding position of the blocks 7 is such that the point of contact of said blocks is so far forward of the pins 12 that the yield of the carrying springs, when the wheel passes suddenly over an obstruction, is not retarded or prevented. It will be noted, however, that as the carrying springs are relieved, and the distance between the body of the vehicle and the axle is increased, the riding point or point of contact of the blocks 7 with the plates 11 moves closer to a point which is directly in line with and above the said pins 12. Due to the construction, the blocks 7 at no time are permitted to assume the direct alinement referred to. As, however, the contact point approaches the vertical position, the resistance offered by the blocks 7 to the fall of the body of the vehicle is progressively increased. Thus, for instance, where the drop of the wheels would be so great as to be practically unrestricted, the blocks 7 would be drawn by the springs 13 to the position of maximum resistance, when the body of the vehicle thereafter endeavors to settle to the normal riding position, it does so against the resistance offered thereto by the blocks 7, which, as they are gradually removed from the path of the descending body, slide forward in the grooves of the plate 11 to a position where the resistance of the blocks 7 is practically neglible. Thus, as seen, the independent movement of both the body and the carrying wheels of the vehicle is accommodated and checked by the blocks 7.

Having thus described my invention, I claim as new and desire to secure by Letters Patent:—

1. A shock absorber, comprising a cam-shaped rigid rocking member interposed between the body and running gear of a vehicle, pivotally connected to one and slidably engaging the other; and independent means for maintaining in contact said member with said body and with said running gear.

2. A shock absorber, comprising a plurality of cam-shaped blocks interposed between the body and running gear of a vehicle, to pivotally engage the one and slidably engage the other, the point of engagement with said blocks being laterally removed from the vertical plane of the pivotal connection thereof; and a plurality of independent springs, one connected with each of said members, for maintaining the sliding connection of said block.

3. A shock absorber, comprising a plurality of volute cam-shaped blocks interposed between the body and running gear of a vehicle, and pivotally mounted upon the one to slidably engage the other, the point of sliding contact being laterally disposed relative the vertical plane of the pivot of said blocks; and a plurality of independent springs, one connected with each of said members, for maintaining the sliding contact of said blocks.

4. In a shock absorber, the combination of a vehicle body having side bars; a plurality of supporting axles for said body; carrying springs interposed between said body and each of said axles; a plurality of rigid members each pivotally mounted on one of said axles to bear on said side bars at a point longitudinally removed from a vertical plane through the axis of the pivot of said members; and a plurality of springs, each operatively connected with one of said members to maintain the engagement thereof with the side bars.

5. In a shock absorber, the combination of a body having side bars; a plurality of supporting axles for said body; carrying springs interposed between said body and each of said axles; a plurality of rigid volute cam members, each pivotally mounted on one of said axles and each shaped to increase the distance of the point of bearing of said members on said side bars from the vertical plane consequent to the separation of said axles and side bars; and a plurality of springs, each operatively connecting one of said members to maintain the engagement thereof with the side bars.

6. In a shock absorber, the combination of a body having side bars; a plurality of supporting axles for said body; carrying springs interposed between said body and each of said axles; a plurality of rigid volute cam members, each pivotally mounted on one of said axles and each shaped to increase the distance of the point of bearing of said members on said side bars from the vertical plane consequent to the separation of said axles and side bars; a plurality of springs, each operatively connecting one of said members to maintain the engagement thereof with said side bars; and a plurality of grooved bearing plates, each mounted on one of said side bars to form guides for said members.

In testimony whereof I have signed my name to this specification in the presence of two subscribing witnesses.

WILLIAM H. BELL.

Witnesses:
E. F. MURDOCK,
PHILIP D. ROLLHAUS.